US010204315B2

(12) United States Patent
White et al.

(10) Patent No.: US 10,204,315 B2
(45) Date of Patent: Feb. 12, 2019

(54) AUTOMATED INVENTORY CONTROL RFID BIN

(71) Applicant: Stanley Industrial & Automotive, LLC, Westerville, OH (US)

(72) Inventors: Christopher White, Marietta, GA (US); William Coulter, Marietta, GA (US); Harold Bolich, Marietta, GA (US); Wan-Chun Liao, Marietta, GA (US); Teddy Bostic, Marietta, GA (US)

(73) Assignee: STANLEY INDUSTRIAL & AUTOMOTIVE, LLC, Westerville, OH (US)

( * ) Notice: Subject to any disclaimer, the term of this patent is extended or adjusted under 35 U.S.C. 154(b) by 0 days.

(21) Appl. No.: 15/587,706

(22) Filed: May 5, 2017

(65) Prior Publication Data
US 2017/0323254 A1 Nov. 9, 2017

Related U.S. Application Data

(60) Provisional application No. 62/332,648, filed on May 6, 2016.

(51) Int. Cl.
*G06Q 10/08* (2012.01)
*G06K 7/00* (2006.01)
(Continued)

(52) U.S. Cl.
CPC ......... *G06Q 10/087* (2013.01); *G06K 7/0008* (2013.01); *G06K 17/0022* (2013.01);
(Continued)

(58) Field of Classification Search
CPC .. G06Q 10/087; G06Q 20/203; G06K 7/0008; G06K 17/0022; G06K 7/10415;
(Continued)

(56) References Cited

U.S. PATENT DOCUMENTS 4,651,883 A    3/1987   Gullett et al.
5,111,942 A    5/1992   Bernardin
(Continued)

OTHER PUBLICATIONS

Notification of Transmittal of the International Search Report and the Written Opinion of the International Searching Authority, or the Declaration, PCT/US2017/031247, dated Aug. 1, 2017.

*Primary Examiner* — Hai Phan
*Assistant Examiner* — Anthony D Afrifa-Kyei
(74) *Attorney, Agent, or Firm* — Thomas | Horstemeyer, LLP

(57) ABSTRACT

Disclosed are various embodiments for automated tracking of inventory levels in storage bins. In one embodiment, among others, an adjustable bin divider may comprise a supporting base that has a receiving slot at an end, the receiving slot comprising a slide channel that extends along a top portion of the supporting base; a radio frequency identification (RFID) tag that is attached to the supporting base; and a radio frequency (RF)-blocking slide divider that comprises a first panel with an RF shield and a second panel that has a narrowed end, the first panel being connected to the second panel at the narrowed end, the first panel being inserted in the receiving slot, the narrowed end fitting within the slide channel of the receiving slot, wherein the RF-blocking slide divider conceals the RFID tag from detection from an RFID reader at a position along the slide channel.

19 Claims, 10 Drawing Sheets

(51) Int. Cl.
  *G06K 17/00* (2006.01)
  *G06Q 20/20* (2012.01)
  *G07G 1/00* (2006.01)
  *H01Q 1/22* (2006.01)

(52) U.S. Cl.
  CPC ........... *G06Q 20/203* (2013.01); *G07G 1/009* (2013.01); *H01Q 1/2216* (2013.01)

(58) Field of Classification Search
  CPC ........... G06K 19/0707; G06K 7/10059; G07G 1/009; H01Q 1/2216
  See application file for complete search history.

(56) References Cited

U.S. PATENT DOCUMENTS

| | | |
|---|---|---|
| 8,738,474 B1 | 5/2014 | McHugh |
| 8,812,378 B2 * | 8/2014 | Swafford, Jr. .......... A47F 1/126 705/28 |
| 2004/0224135 A1 * | 11/2004 | Krebs .................. G06K 7/0008 428/195.1 |
| 2005/0040934 A1 | 2/2005 | Shanton |
| 2010/0259365 A1 * | 10/2010 | Knadle, Jr. .......... G06K 7/0008 340/10.1 |
| 2013/0048724 A1 | 2/2013 | Burnside |
| 2013/0310967 A1 | 11/2013 | Olson |

\* cited by examiner

AUTOMATED INVENTORY CONTROL RFID BIN

CROSS REFERENCE TO RELATED APPLICATIONS

This application claims the benefit of, and priority to, U.S. Provisional Patent Application No. 62/332,648 entitled "AUTOMATED INVENTORY CONTROL RFID BIN" filed on May 6, 2016, which is incorporated herein by reference in its entirety.

BACKGROUND

A storage bin is a container that can vary in size and shape. Oftentimes, a storage bin is used to hold multiple items. The storage bin can be configured to provide easy access to the items based on its size and shape. Multiple storage bins may also be placed on a storage rack. With multiple storage bins on a storage rack, different items can be placed in each storage bin. As a result, an individual can have easy access to various items.

SUMMARY

Embodiments of the present disclosure are related to a radio frequency identification (RFID)-enabled storage bin configured to transmit an indication of inventory levels of items in a storage bin to a remote computing device.

In one embodiment, among others, an adjustable bin divider is provided comprising a supporting base that has a receiving slot at an end, the receiving slot comprising a slide channel that extends along a portion of a top side of the supporting base; a radio frequency identification (RFID) tag that is attached to the supporting base; and a radio frequency (RF)-blocking slide divider that comprises a first panel with an RF shield and a second panel that has a narrowed end, the first panel being connected to the second panel at the narrowed end, the first panel being inserted in the receiving slot, the narrowed end fitting within the slide channel of the receiving slot, wherein the RF-blocking slide divider conceals the RFID tag from detection from an RFID reader at a position along the slide channel.

In various embodiments, the position can comprise a first position. The adjustable bin divider can be positioned at an incline and the RF-blocking slide divider can move from the first position to a second position along the slide channel in response to gravity. In various embodiments, the adjustable bin divider can be positioned within a storage bin. In addition, the adjustable bin divider can further comprise a coiled spring that is attached to a back panel of the storage bin and the second panel of the RF-blocking slide divider.

In various embodiments, the position can comprise a first position, and the RF-blocking slide divider can move from the first position to a second position along the slide channel in response to the coiled spring pushing the second panel away from the back panel of the storage bin.

In various embodiments, the RF shield can be positioned substantially over the RF tag. In addition, the RF shield can comprise at least one of a metal foil, a metal sheet, a metal screen, a metal tape, or a metal foam. In various embodiments, the RF shield can comprise at least one of aluminum, copper, nickel, lead, or iron. In various embodiments, the second panel can be oriented in a plane different from the first panel.

In another embodiment, among others, an apparatus is provided comprising a storage bin; a radio frequency identification (RFID) tag that is attached to an interior portion of the storage bin; a supporting base that is positioned within the storage bin and has a receiving slot at an end, the receiving slot comprising a slide channel that extends along a top portion of the supporting base; and a radio frequency (RF)-blocking slide divider that comprises a base panel and a divider panel that has a narrowed end, the base panel being connected to the divider panel at the narrowed end, the divider panel comprising an RF shield, the base panel being inserted in the receiving slot, the narrowed end fitting within the slide channel, wherein the RF-blocking slide divider conceals the RFID tag from detection from an RFID reader at a position along the slide channel.

In various embodiments, the supporting base can be positioned at an incline within the storage bin. In various embodiments, the position along the slide channel can be substantially near the end of the supporting base with the receiving slot. In addition, the position can comprise a first position, and the RF-blocking slide divider can move along the slide channel of the receiving slot from the first position to a second position, where the second position can be substantially near a distal end away from the receiving slot of the supporting base. In various embodiments, the apparatus can comprise a coiled spring that is attached to the divider panel and the interior portion of the storage bin. In addition, the RFID reader can be in data communication with a network connected storage device.

In another embodiment, among others, an apparatus is provided comprising a storage bin that includes an elevated platform. The elevated platform and a bottom portion of the storage bin can form a receiving slot, where the receiving slot comprises a slide channel that extends along a portion of the elevated platform; a radio frequency identification (RFID) tag that is attached to a portion of the storage bin; and a radio frequency (RF)-blocking slide divider that comprises a base panel connected to a divider panel that has a narrowed end. The base panel can be inserted in the receiving slot, and the narrowed end can fit within the slide channel. The RF-blocking slide divider comprises an RF shield and conceals the RFID tag from detection from an RFID reader at a position along the slide channel.

In various embodiments, the RFID tag can be attached to a bottom portion of the storage bin or a back panel of the storage bin. In addition, the RF shield can be attached to a portion of the divider panel. In various embodiments, the RF shield can be attached to the base panel. In addition, the apparatus can comprise a coiled spring that is attached to an interior wall of the storage bin and the divider panel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

Figure 1A:
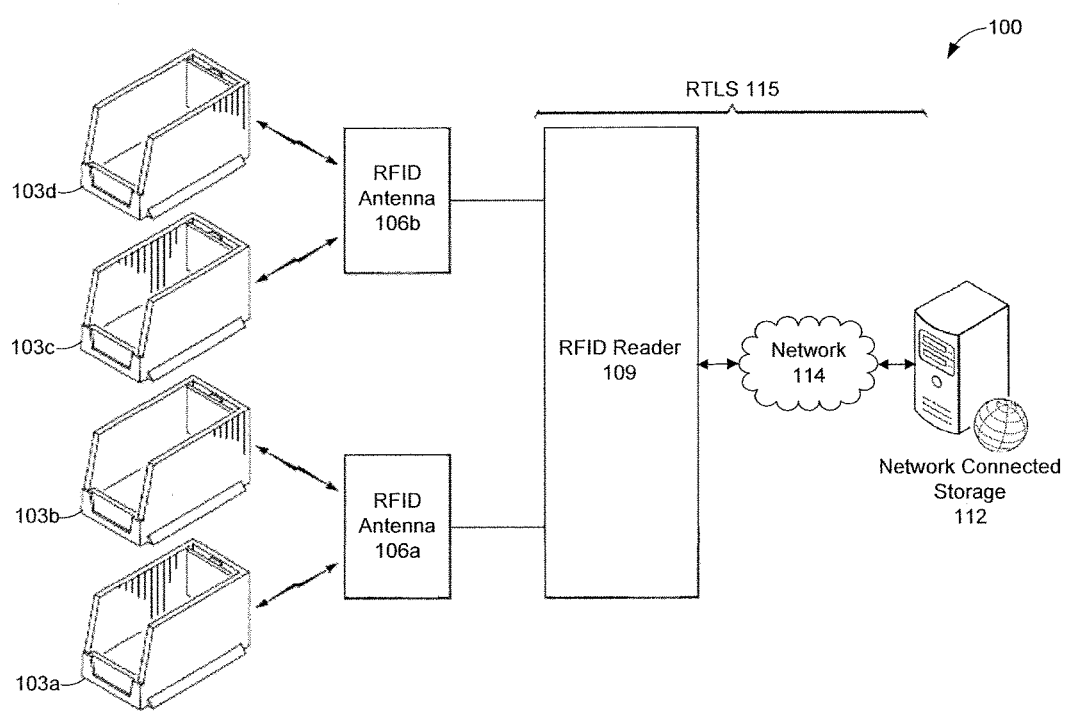
FIG. 1A illustrates a networked environment according to various embodiments of the present disclosure.

The drawings illustrate only exemplary embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar reference numerals between figures designates like or corresponding, but not necessarily identical, elements.

DETAILED DESCRIPTION

Typically, a storage bin is a container used to hold multiple items. In some scenarios, various storage bins may each be used for bulk storage of identical items. As items are retrieved, individual storage bins may run out of their particular item at different rates. In that context, the present disclosure relates to automated tracking of inventory levels of items contained in storage bins.

In particular, various embodiments of the present disclosure relate to a radio frequency identification (RFID)-enabled storage bin that can be used to create an indication of inventory levels of items in the storage bin. For example, in some situations, there may be multiple RFID-enabled storage bins in an area. When a respective RFID-enabled storage bin reaches a threshold (e.g. near-empty or empty), the RFID-enabled storage bin can be configured to enable an RFID tag to be read by an RFID reader. More specifically, the RFID-enabled storage bin can use an adjustable bin divider that masks an RFID tag from detection when the RFID-enabled storage bin has sufficient inventory and unmasks the RFID tag in situations where the inventory needs to be restocked. In addition, the RFID tag can contain data that indicates a particular RFID-enable storage bin, a particular item and a particular location within a facility. An RFID antenna that detects the RFID tag may be fixed to a known location. Accordingly, a location of the item that needs to be restocked can be identified by the RFID tag and/or the RFID antenna.

The present disclosure of the various embodiments has several advantages over existing storage solutions. For instance, the various embodiments of the present disclosure enable automated inventory level tracking of items in various storage bins. This functionality reduces the amount of time required to replenish stock. Typically, storage bins have to be manually checked to determine the inventory levels for each storage bin. Thus, the embodiments of the present disclosure can substantially minimize, if not entirely eliminate, the time needed to determine which storage bins need to be replenished. In addition, the automated inventory level tracking can also be integrated into other supply chain operations such as automating the placement of purchase orders for items that need to be replenished.

In the following paragraphs, the embodiments are described in further detail by way of example with reference to the attached drawings. In the description, well known components, methods, and/or processing techniques are omitted or briefly described so as not to obscure the embodiments. Turning now to the drawings, a general description of exemplary embodiments of an RFID-enabled storage bin and its components are provided, followed by a discussion of the operation of the system.

With reference to FIG. 1, shown is a networked environment 100 according to various example embodiments. The networked environment 100 includes RFID-enabled storage bins 103a-103d (collectively "RFID-enabled storage bins 103"), RFID antennas 106a and 106b (collectively "RFID antennas 106"), an RFID reader 109, and a networked connected storage device 112. Each RFID-enabled storage bin 103 may include a container of varying size and shape. The RFID-enabled storage bins 103 can be used for bulk storage of identical items. In some embodiments, among others, the RFID-enabled storage bin 103 may include, for example, an adjustable bin divider (FIG. 4A) that has an RFID tag (FIG. 2B). In other embodiments, among others, the RFID-enabled storage bin 103 can have the RFID tag positioned along an interior wall or a bottom portion. The RFID tag may be a passive or active RFID tag.

The RFID-enabled storage bins 103 can be in data communication with an RFID reader 109, via the RFID antennas 106. Each RFID antenna 106 can be positioned at a fixed location to transmit data to and/or receive data from one or multiple RFID-enabled storage bins 103. The data is transmitted and received in a form of radiated energy.

The RFID reader 106, also known as an interrogator, can be electrically coupled to one or more RFID antennas 109. The RFID reader 109 can be used to provide a data connection between the RFID tag and the network connected storage device 112, via the network 114. The RFID reader 106 may comprise, for example, a chipset, a module, or other suitable integrated form factors. The networked connected storage device 112 may comprise, for example, a server computer or any other system providing computing capability. Alternatively, the networked connected storage device 112 may employ a plurality of storage devices arranged, for example, in one or more server or computer banks or other arrangements. Such storage devices may be located in a single installation or distributed among different geographical locations. For example, the networked connected storage device 112 may include a plurality of computing devices and storage devices that together comprise a cloud computing resource, a grid computing resource, and/or any other distributed computing arrangement. In some embodiments, among others, the RFID reader 109 and the networked connected storage device 112 can be employed as a real-time location system (RTLS) 115. In these embodiments, among others, the RTLS 115 can operate to provide in real-time, or nearly real-time, a location of the RFID-enabled storage bin 103 that needs to be replenished with inventory. The network 114 may include, for example, the Internet, intranets, extranets, wide area networks (WANs), local area networks (LANs), wired networks, wireless networks, or other suitable networks, etc., or any combination of two or more such networks.

Next, a general description of the operation of the various components of the networked environment 100 is provided. To begin, multiple RFID-enabled storage bins 103 may each contain different levels of inventory. In a situation where there is sufficient inventory, an RF-blocking slide divider (FIG. 4A) masks the RFID tag from being detected by the RFID antennas 106. Accordingly, the RFID reader 109 is prevented from receiving data from the RFID tag. As inventory is removed, the RF-blocking slide divider moves toward a front portion of the RFID-enabled storage bin 103. When the inventory level reaches a threshold, the RF-blocking slide divider will have moved far enough away from the RFID tag that it can be detected by the RFID antenna 106. In this situation, the RFID reader 109 can receive data from the RFID tag. The received data may include, for example, a bin identifier, a bin location, a product identifier, or other suitable data associated with the RFID-enabled storage bin 103. The RFID reader 109 can also receive an indication as to which RFID antenna 106 detected the RFID tag. This information can be used to determine a location of the RFID-enabled storage bin 103 that needs to be replenished. In some scenarios, the detection of the RFID tag can initiate the placement of purchase orders for the items associated with the RFID-enabled storage bin 103. Particularly, the detection of the RFID tag can initiate transmitting a purchase order to a remote computing device over the network 114

Figure 1B:
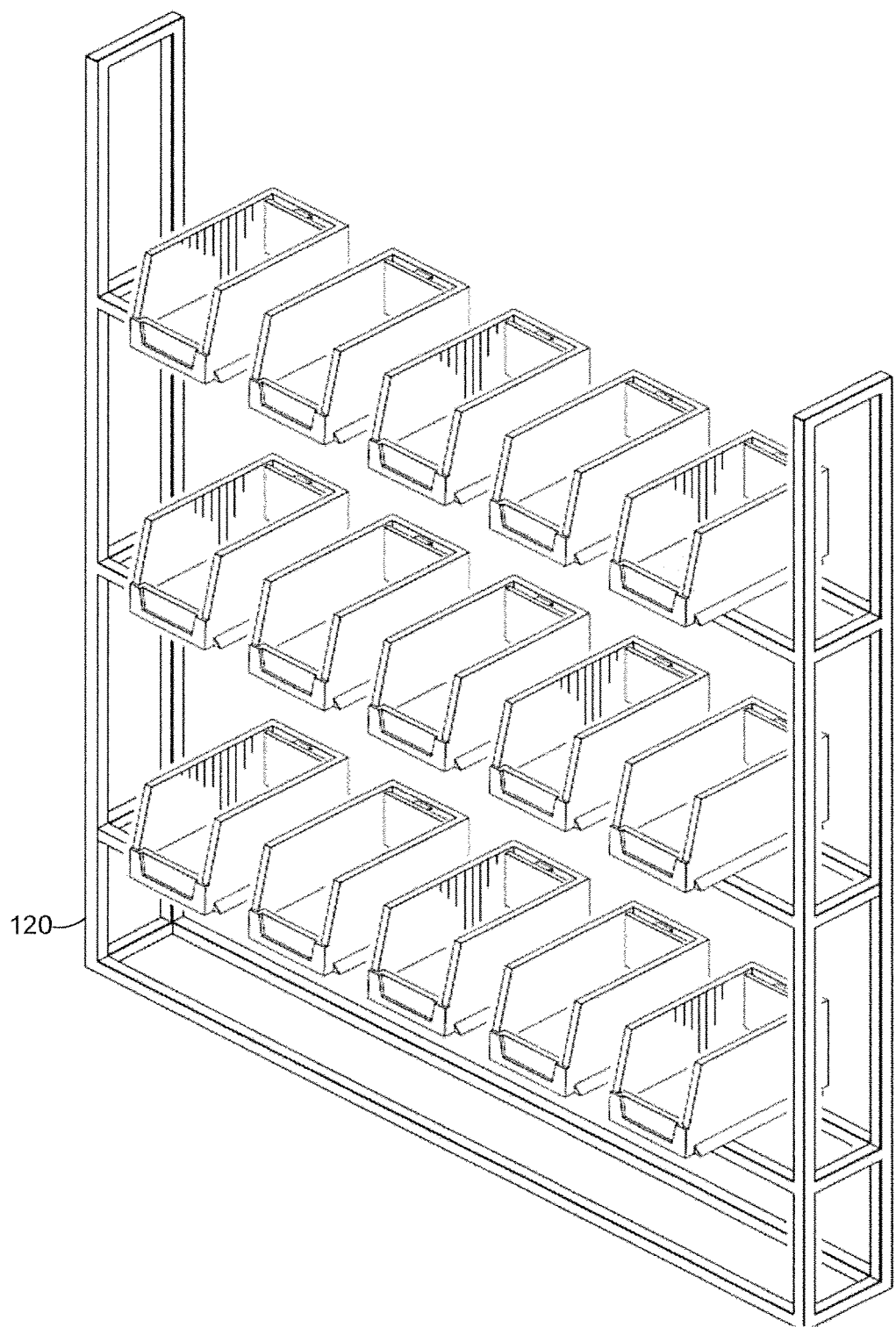
FIG. 1B illustrates a perspective view of an example storage bin rack according to various embodiments of the present disclosure.

Referring next to FIG. 1B, shown is a perspective view of a storage bin rack 120 according to various embodiments of the present disclosure. As shown in FIG. 1B, the storage bin rack 120 may include multiple RFID-enabled storage bins 103 at different inventory levels. As discussed above, the RFID antennas 106 can be positioned to detect multiple RFID-enabled storage bins 103 when inventory levels reach a threshold. In some embodiments, among others, a shelf in the storage bin rack 120 may be oriented at an incline. As a result, the RFID-enabled storage bins 103 are positioned at an incline and gravity facilitates moving the RF-blocking slide divider toward the front portion of the RFID-enabled storage bins 103 as items are removed. As one non-limiting example, the shelf is configured such that the RFID-enabled storage bins 103 are inclined at least 30 degrees with respect to a horizontal reference plane, such as a shelf or the floor.

Figure 2A:
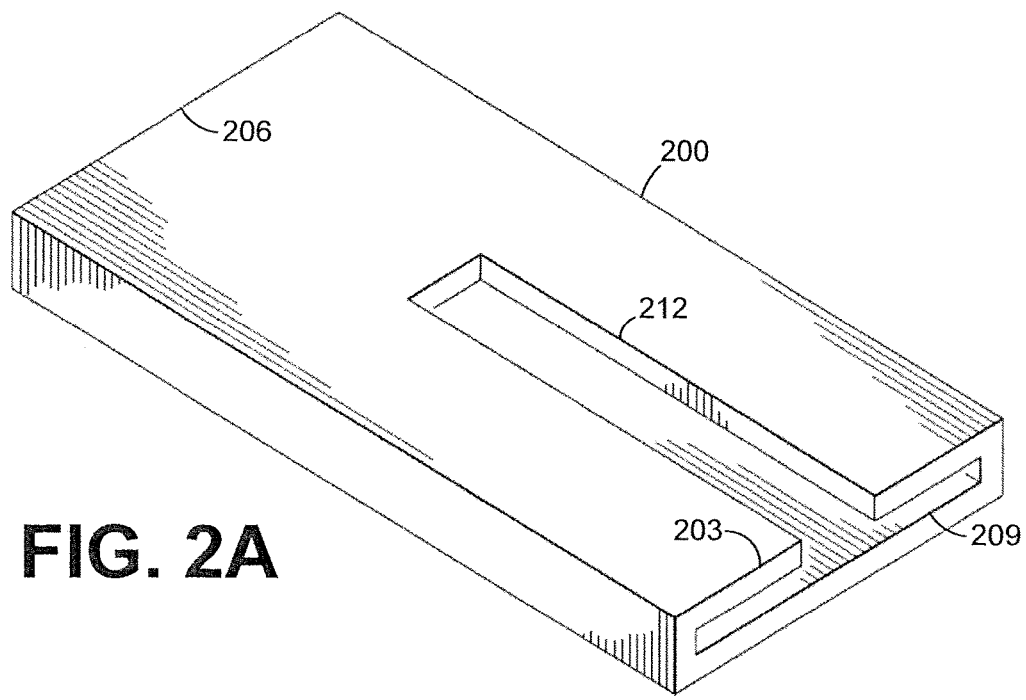
FIGS. 2A and 2B illustrate perspective views of an example supporting base of a radio frequency identification (RFID)-enabled storage bin according to various embodiments of the present disclosure.
Figure 2B:
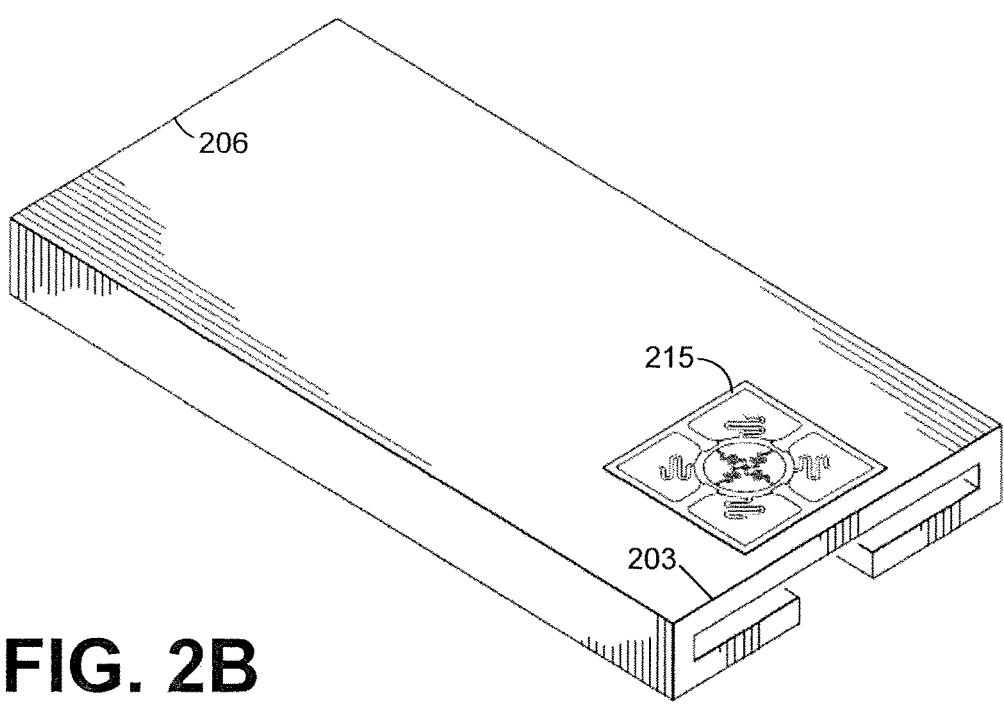

With respect to FIG. 2A, shown is a top side perspective view of a supporting base 200 associated with the RFID-enabled storage bin 103. As shown in the illustrated embodiment, the supporting base 200 may comprise, for example, a first end 203 and a second end 206. The supporting base 200 can have a receiving slot 209 at the first end 203. The receiving slot 209 may comprises a slide channel 212 that extends along a portion of the top side of the supporting base 200. An RF-blocking slide divider (FIG. 3) can be inserted in the receiving slot 209. A support member (FIG. 3) or a narrowed end of a divider panel can fit within the slide channel 212. Accordingly, the RF-blocking slide divider can move along the slide channel 212.

With respect to FIG. 2B, shown is a perspective bottom side view of the supporting base 200 associated with the RFID-enabled storage bin 103. A bottom side of the supporting base 200 may comprise an RFID tag 215. The RFID tag 215 can be a passive or active RFID tag. Although shown as being near the first end 203, the RFID tag 215 can be positioned at various locations on the supporting base 200. In some embodiments, among others, the RFID tag 215 may be positioned at different locations to correspond to a particular level of inventory remaining in the RFID-enabled storage bin 103 when the RFID tag 215 is detected. For example, in FIG. 2B, the RFID tag 215 is positioned near the first end 203. As items are removed, the RF-blocking slide divider (FIG. 3) moves toward the second end 206 along the slide channel 212. When the RF-blocking slide divider moves far enough away from the RFID tag 21, the RFID antenna 106 will detect the RFID tag 215. At this position along the slide channel 212, the location of the RF-blocking slide divider may correspond to 50% remaining inventory in the RFID-enabled storage bin 103. As another non-limiting example, the RFID tag 215 may be positioned substantially equal distance from the first end 203 and the second end 206 of the supporting base 200. In this example, when the RFID tag 215 is detected, it may correspond to the RFID-enabled storage bin 103 being empty or nearly-empty of inventory.

Figure 3:
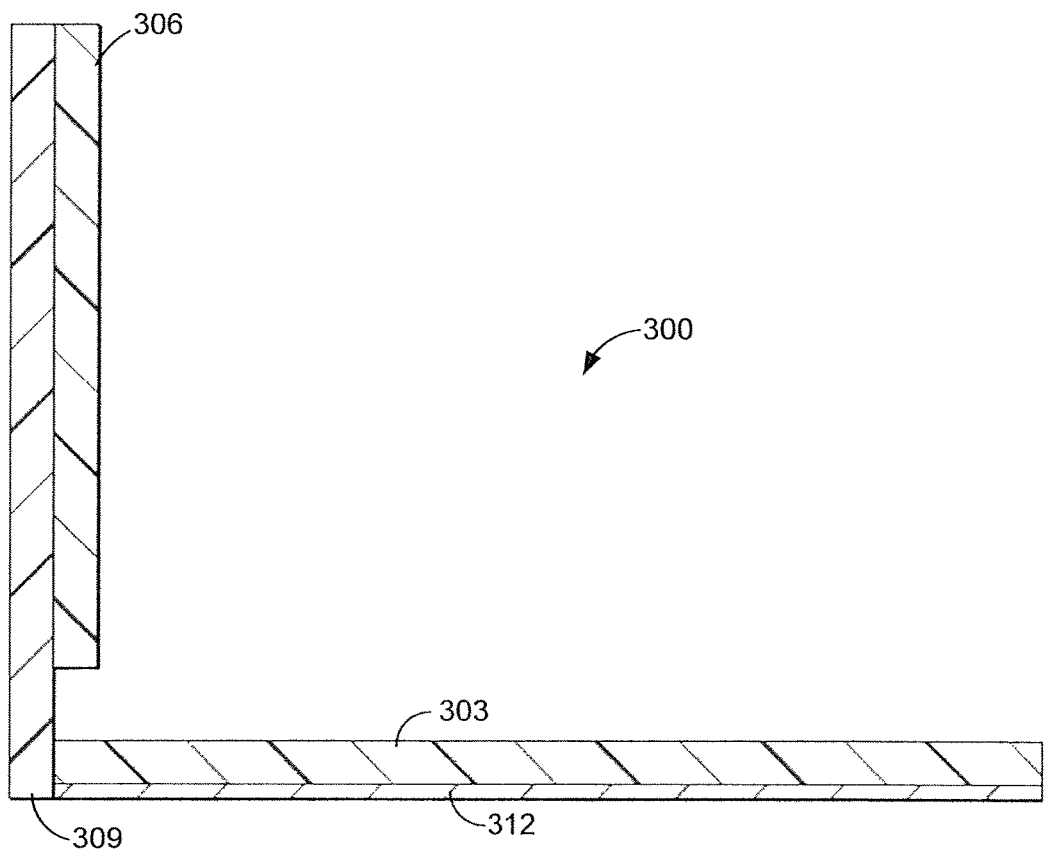
FIG. 3 illustrates a cross sectional view of an example radio frequency (RF)-blocking slide divider of the RFID-enabled storage bin according to various embodiments of the present disclosure.

With reference to FIG. 3, shown is a cross sectional view of an RF-blocking slide divider 300 of the RFID-enabled storage bin 103 according to various embodiments of the present disclosure. As shown in FIG. 3, the RF-blocking slide divider 300 may comprise, for example, a base panel 303 and a divider panel 306. In some embodiments, the base panel 303 is connected to divider panel 306 by way of a support member 309. The support member 309 can have a narrow width such that it fits within the slide channel 212 of the supporting base 200. In some embodiments, among others, the support member 309 may be omitted and the divider panel 306 may have a narrowed end that is connected to the base panel 303. The narrowed end can be of an appropriate size such that it fits within the slide channel 212. In addition, the base panel 303 may include an RF shield 312. The RF shield 312 may comprise, for example, a metal foil, a metal sheet, a metal screen, a metal foam, a metal tape, or other suitable forms of RF shielding. The RF shield 312 may be comprised of aluminum, copper, nickel, lead, iron, or other suitable RF shielding material elements.

As discussed above, the RE-blocking slide divider 300 can be inserted within the receiving slot 209. In particular, the base panel 303 is inserted within the receiving slot 209. When inserted, the divider panel 306 can be outside of the receiving slot 209. The divider panel 306 can be used to push inventory items toward a front portion of the RFID-enabled storage bin 103.

Figure 4A:
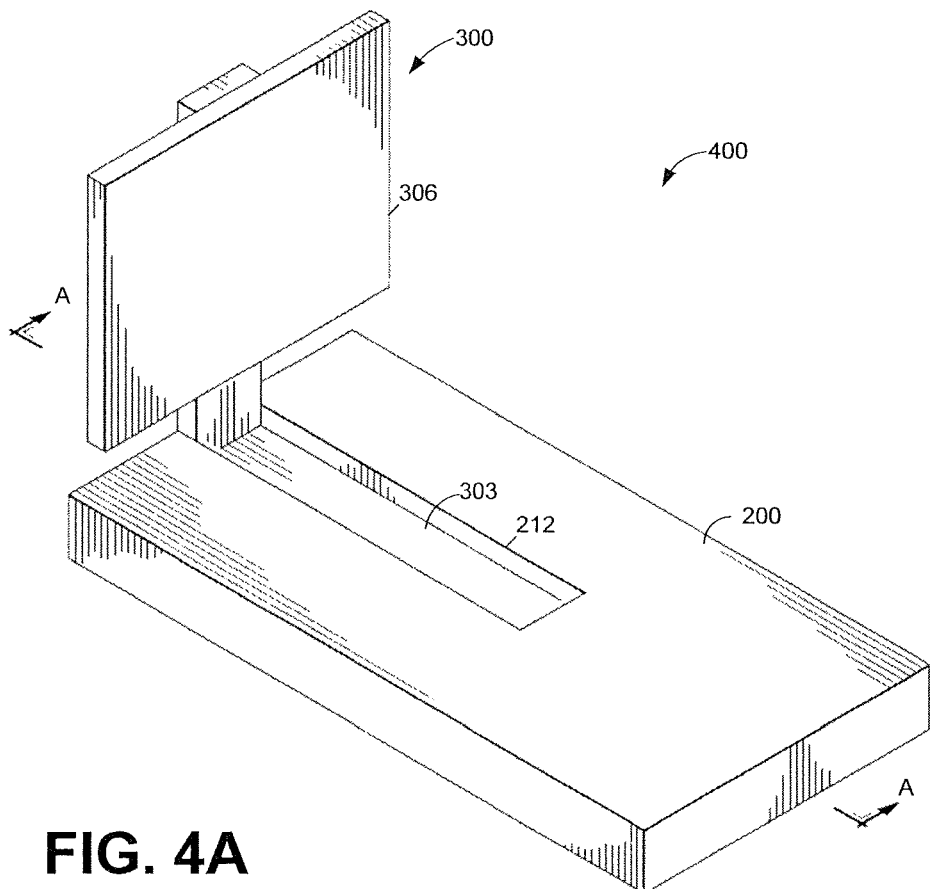
FIG. 4A illustrates a perspective view of the RF-blocking slide divider from FIG. 3 inserted in the supporting base from FIGS. 2A and 2B according to various embodiments of the present disclosure.

Referring next to FIG. 4A, shown is a perspective view of an adjustable bin divider 400. The adjustable bin divider 400 may include, for example, the RF-blocking slide divider 300 (FIG. 3) inserted within the supporting base 200 from FIGS. 2A and 2B. Additionally, FIG. 4A displays a cross sectional reference "AA" for FIG. 4B. The arrows associated with the "AA" cross sectional reference in FIG. 4A provide an indication of the direction of the cross sectional view for FIG. 4B.

Figure 4B:
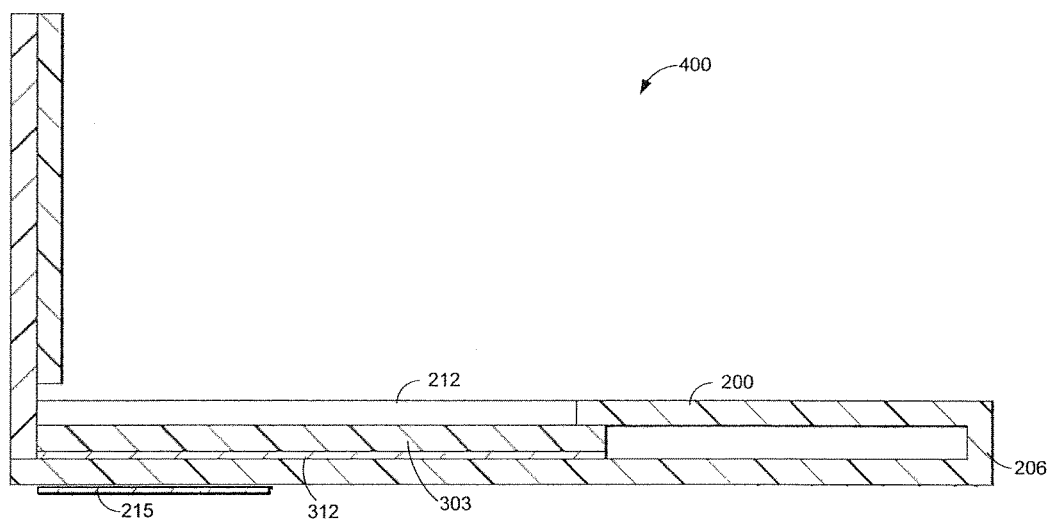
FIG. 4B illustrates a cross sectional view of the RF-blocking slide divider from FIG. 3 inserted in the supporting base from FIGS. 2A and 2B according to various embodiments of the present disclosure.

Moving on to FIG. 4B, shown is a cross sectional view of the adjustable bin divider 400. In FIG. 4B, the adjustable bin divider 400 is shown with the RF-blocking slide divider 300 (FIG. 3) inserted within the supporting base 200 from FIGS. 2A and 2B. As shown, the RF shield 312 can substantially cover the RFID tag 215. In this situation, the RFID tag 215 is concealed from being detected by the RFID antennas 106 at the illustrated position. As the base panel 303 moves further into the receiving slot 209 and toward the second end 206, the RF shield 312 moves away from the RFID tag 215. Once at an appropriate position, the RFID tag 215 can be detected by the RFID antenna 106 and data can be communicated from the RFID tag 215 to the RFID reader 109.

Figure 5A:
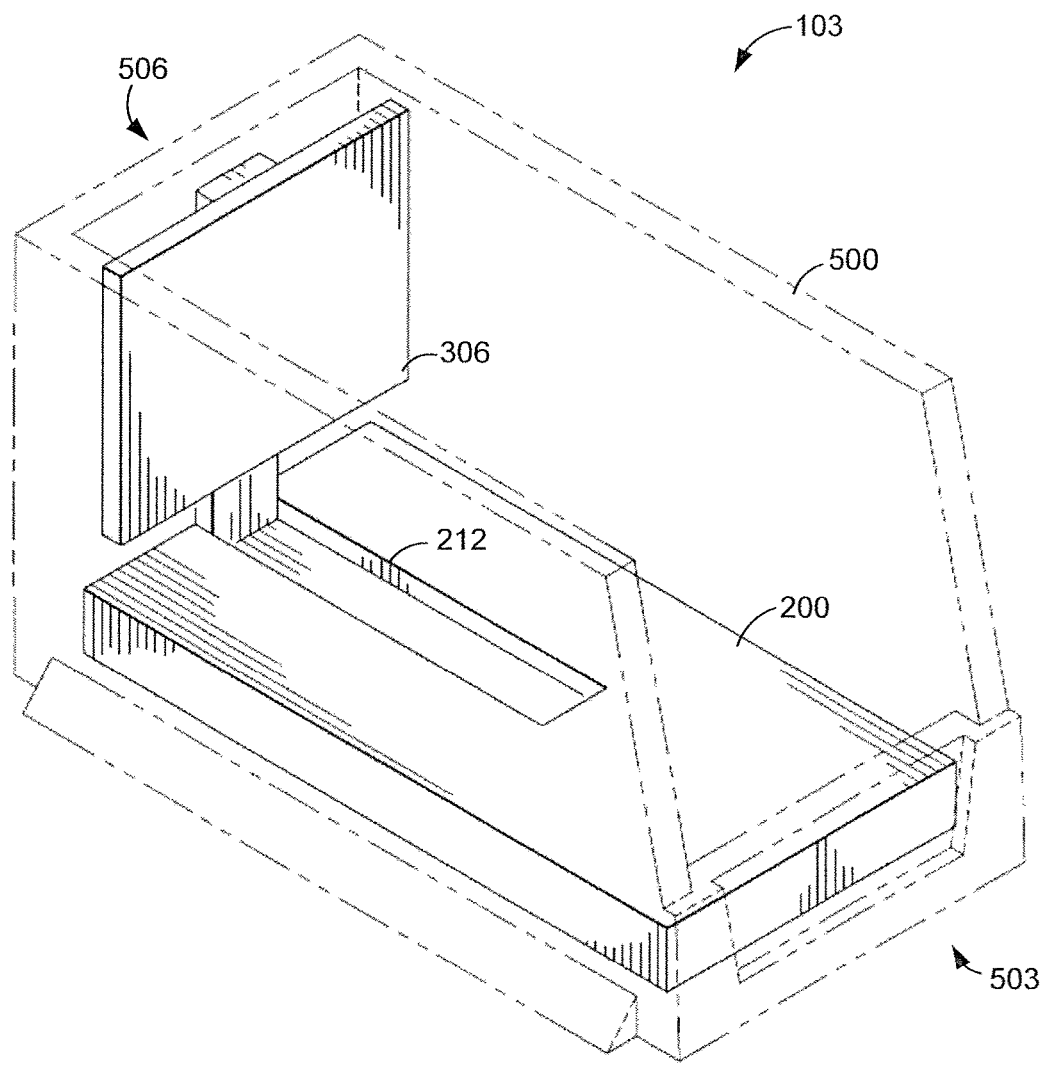
FIG. 5A illustrates a perspective view of an example of the RFID-enabled storage bin concealing an RFID tag at a first position along a slide channel according to various embodiments of the present disclosure.

With regard to FIG. 5A, shown is a perspective view of the RFID-enabled storage bin 103 concealing an RFID tag at a first position along the slide channel 212 according to various embodiments of the present disclosure. As shown in the illustrated embodiment, the RFID-enabled storage bin 103 may comprise, for example, the supporting base 200, the RF-blocking slide divider 300, and a storage bin 500. The storage bin 500 can have a front portion 503 and a back portion 506. In some embodiments, among others, the storage bin 500 has a first opening near the front portion 503 and a second opening at the top of the storage bin 500. These openings provide access to items contained within the RFID-enabled storage bin 103. As one skilled in the art can appreciate, storage bins 500 can be manufactured in varying sizes and designs.

In the illustrated embodiment, the RFID-enabled storage bin 103 may be configured such that the adjustable bin divider 400 is presently in a position that conceals the RFID tag 215, as shown in FIG. 4B, from being detected by the RFID antenna 106. As one non-limiting example, the RFID-enabled storage bin 103 may contain multiple inventory items on a top portion of the supporting base 200 and in front of the divider panel 306. As inventory items are removed, the RF-blocking slide divider 300 moves toward the front portion 503 of the storage bin 500 along the slide channel 212.

Figure 5B:
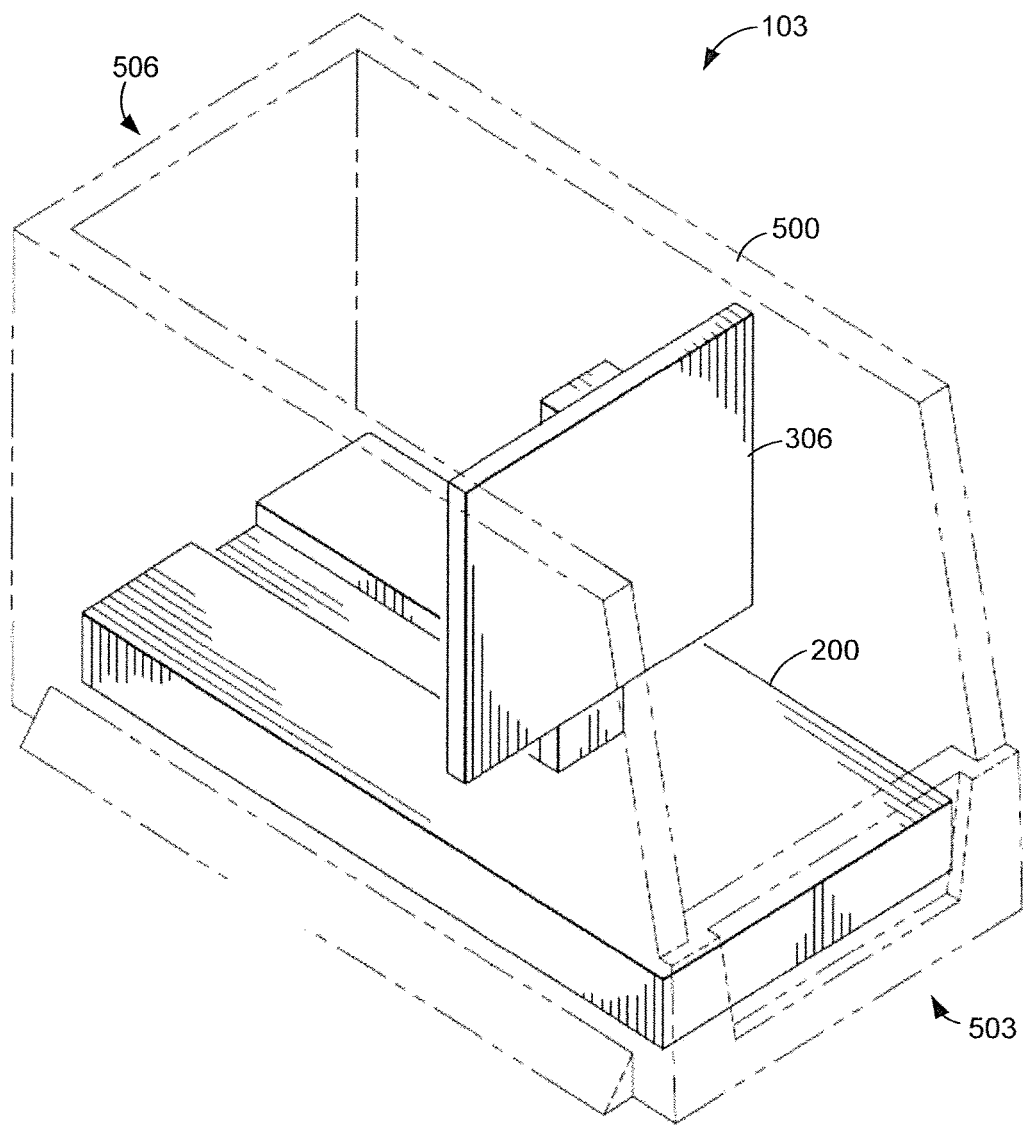
FIG. 5B illustrates a perspective view of an example of the RFID-enabled storage bin exposing the RFID tag for detection at a second position along the slide channel according to various embodiments of the present disclosure.

Turning to FIG. 5B, shown is a perspective view of the RFID-enabled storage bin 103 exposing an RFID tag at a second position along the slide channel 212 according to various embodiments of the present disclosure. As the RF-blocking slide divider 300 moves forward, the RF shield 312 can be moved away from the RFID tag 215. Once at an appropriate distance, the RFID tag 215 can be exposed to the RFID antennas 106, which can facilitate data communication between the RFID tag 215 and the RFID reader 109.

As another non-limiting example, the RF-blocking slide divider 300 can move from the first position to the second position, as shown in FIG. 5B, in response to gravity. For instance, in some embodiments, among others, the RFID-enabled storage bin 103 or the adjustable bin divider 400 can be positioned at an incline. At an inclined position, gravity can facilitate the RF-blocking slide divider 300 moving toward the front portion 503 of the storage bin 500 as inventory items are removed. In one embodiment, among others, the RF-blocking slide divider 300 may positioned at an incline of at least 30 degrees with respect to a horizontal reference plane, such as a shelf or the floor. The RF-blocking slide divider 300 can also push the remaining inventory items toward the front portion 503 of the storage bin 500.

In some embodiments, among others, the RFID-enabled storage bin 103 may have the supporting base 200 integrated within a portion of the storage bin 500. For instance, a storage bin can have a receiving slot formed from a bottom portion of the storage bin and an elevated platform that includes a slide channel. In this non-limiting example, the RF-blocking slide divider 300 can then be inserted into the receiving slot. As one skilled in the art can appreciate, the receiving slot can be formed using other portions of the storage bin.

Figure 6A:
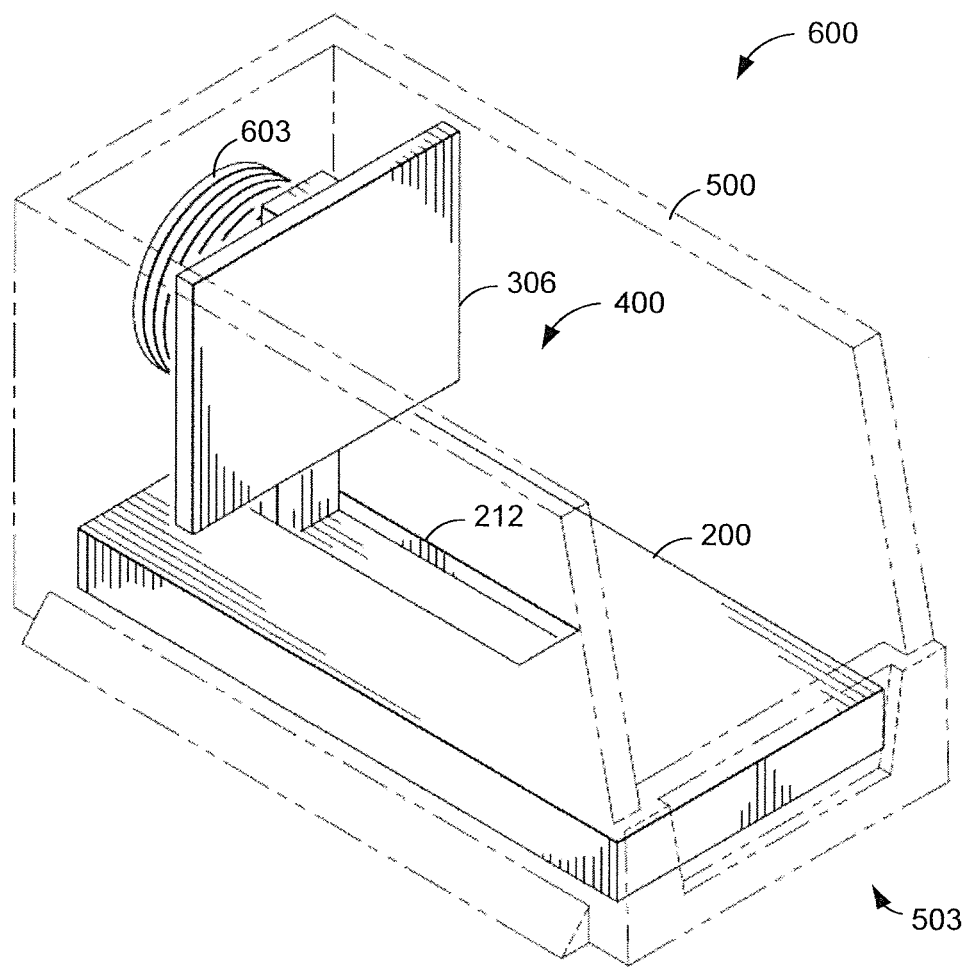
FIG. 6A illustrates a perspective view of an example of an RFID-enabled coiled spring bin at a first position along the slide channel according to various embodiments of the present disclosure.

With respect to FIG. 6A, shown is a perspective view of an RFID-enabled coiled spring bin 600 at a first position along the slide channel 212 according to various embodiments of the present disclosure. The RFID-enabled coiled spring bin 600 may comprise, for example, the adjustable bin divider 400 positioned within the storage bin 500. The RFID-enabled coiled spring bin 600 may also include a coiled spring 603 attached to an interior wall of the storage bin 500 and the divider panel 306. In FIG. 6A, the coiled spring 603 is shown in a compressed state. The coiled spring 603 may include a spring-loaded plunger or other suitable spring devices.

As a non-limiting example, the RFID-enabled coiled spring bin 600 can contain multiple inventory items. As discussed above, the inventory items may be placed on a top portion of the supporting base 200 and in front of the divider panel 306. In some embodiments, among others, the inventory items within the RFID-enabled coiled spring bin 600 can facilitate keeping the coiled spring 603 from pushing the divider panel 306 toward the front portion 503 of the storage bin 500. For instance, a quantity and/or a collective weight of the inventory items can facilitate keeping the coiled spring 603 and the divider panel 306 at a particular position. As an item is removed, the coiled spring 603 can extend its length and as a result, push the divider panel 306 of the RF-blocking slide divider 300 along the slide channel 212 toward the front portion 503 of the storage bin 500.

Figure 6B:
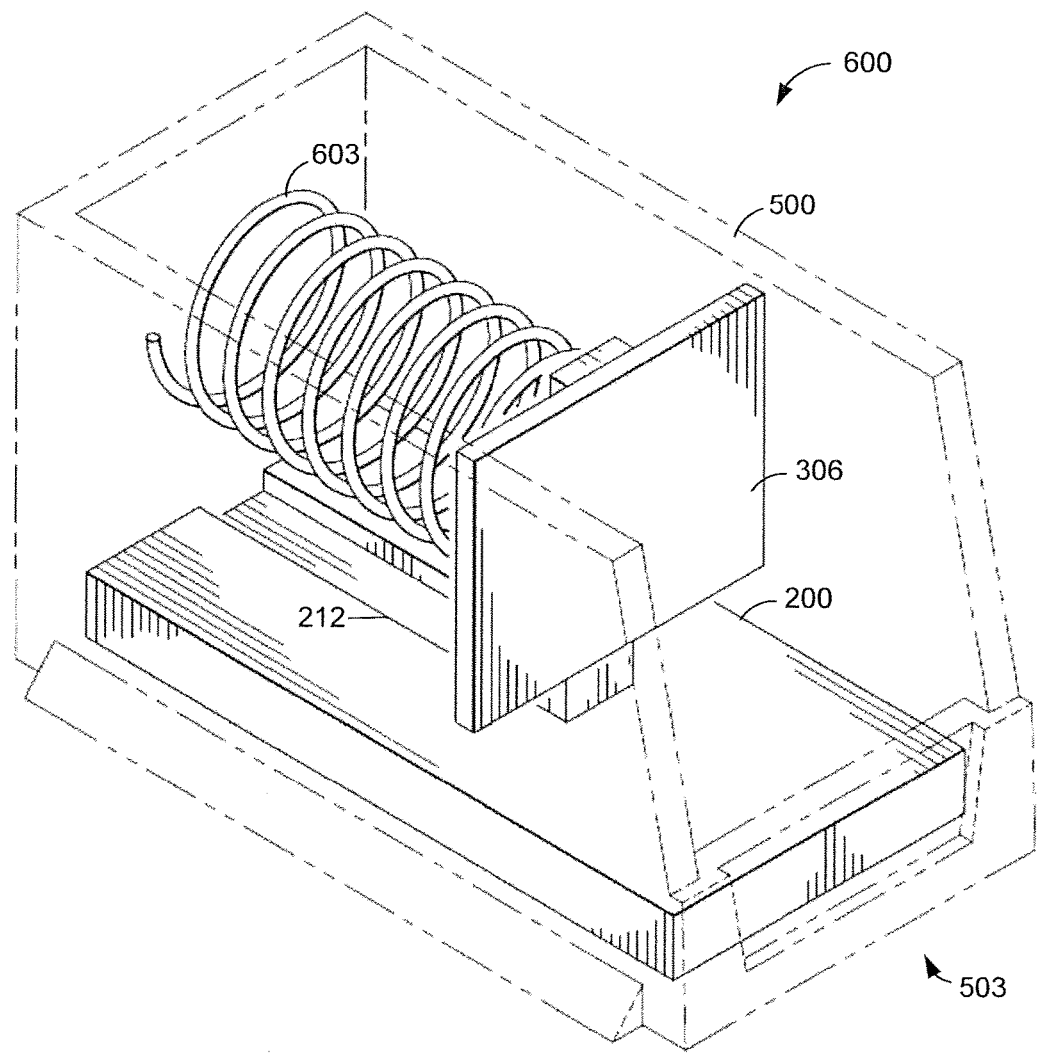
FIG. 6B illustrates a perspective view of the RFID-enabled coiled spring bin in FIG. 6A at a second position along the slide channel according to various embodiments of the present disclosure.

Turning to FIG. 6B, shown is a perspective view of the RFID-enabled coiled spring bin 600 at a second position along the slide channel 212 according to various embodiments of the present disclosure. As discussed above, the divider panel 306 of the RF-blocking slide divider 300 (FIG. 3) moves toward the front portion 503 of the storage bin 500 when items are removed. As shown in FIG. 6B, after an item is removed, the coiled spring 603 can expand. As such, the coiled spring 603 pushes the divider panel 306 forward and in turn, the divider panel 306 can push the remaining inventory items toward the front portion 503 of the storage bin 500.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. An adjustable bin divider for cooperation with a radio frequency identification (RFID) reader, the adjustable bin divider comprising:
   a supporting base that has a receiving slot at an end, the receiving slot comprising a slide channel that extends along a portion of a top side of the supporting base;
   a radio frequency identification (RFID) tag that is attached to the supporting base;
   and a radio frequency (RF)-blocking slide divider that comprises a first panel with an RF shield and a second panel that has a narrowed end, the first panel being connected to the second panel at the narrowed end, the first panel being inserted in the receiving slot, the narrowed end fitting within the slide channel of the receiving slot, wherein the RF shield conceals the RFID tag from detection from the RFID reader at a first position along the slide channel, wherein the RF shield exposes the RFID tag to detection from the RFID reader at a second position along the slide channel, and wherein the second position of the RF shield is further away from the end of the supporting base in comparison to the first position of the RF shield; and
   wherein the RF tag comprises data representing an inventory threshold, and the RF tag communicates the inventory threshold of the storage bin to the RFID reader upon being activated by the RFID reader.

2. The adjustable bin divider of claim 1, wherein the adjustable bin divider is positioned at an incline and the RF shield moves from the first position to the second position in response to gravity.

3. The adjustable bin divider of claim 1, wherein the adjustable bin divider is positioned within a storage bin.

4. The adjustable bin divider of claim 3, further comprising a coiled spring that is attached to a back panel of the storage bin and the second panel of the RF-blocking slide divider.

5. The adjustable bin divider of claim 4, wherein the RF shield moves from the first position to the second position in response to the coiled spring pushing the second panel away from the back panel of the storage bin.

6. The adjustable bin divider of claim 1, wherein the RF shield comprises at least one of a metal foil, a metal sheet, a metal screen, a metal tape, or a metal foam.

7. The adjustable bin divider of claim 1, wherein the RF shield comprises at least one of aluminum, copper, nickel, lead, or iron.

8. The adjustable bin divider of claim 1, wherein the second panel is oriented in a plane different from the first panel.

9. An apparatus for cooperation with a radio frequency identification (RFID) reader, the apparatus comprising:
   a storage bin;
   a radio frequency identification (RFID) tag that is attached to an interior portion of the storage bin;
   a supporting base that is positioned within the storage bin and has a receiving slot at an end, the receiving slot comprising a slide channel that extends along a top portion of the supporting base;
   a radio frequency (RF)-blocking slide divider that comprises a base panel and a divider panel that has a narrowed end, the base panel being connected to the divider panel at the narrowed end, the divider panel comprising an RF shield, the base panel being inserted in the receiving slot, the narrowed end fitting within the slide channel, wherein the RF shield conceals the RFID tag from detection from the RFID reader at a first position along the slide channel, wherein the RF shield exposes the RFID tag to detection from the RFID reader at a second position along the slide channel, wherein the second position of the RF shield is further away from the end of the supporting base in comparison to the first position; and
   wherein the RF tag comprises data representing an inventory threshold, and the RF tag communicates the inventory threshold of the storage bin to the RFID reader upon being activated by the RFID reader.

10. The apparatus of claim 9, wherein the supporting base is positioned at an incline within the storage bin.

11. The apparatus of claim 9, wherein the first position along the slide channel is substantially near the end of the supporting base with the receiving slot, wherein the receiving slot comprises an opening used for inserting the RF-blocking slide divider into the slide channel.

12. The apparatus of claim 9, wherein the second position is substantially near a distal end away from an opening of the receiving slot of the supporting base.

13. The apparatus of claim 9, further comprising a coiled spring that is attached to the divider panel and the interior portion of the storage bin.

14. The apparatus of claim 9, wherein the RFID reader is in data communication with a network connected storage device.

15. An apparatus for cooperation with a radio frequency identification (RFID) reader, the apparatus comprising:
   a storage bin that comprises an elevated platform, the elevated platform and a bottom portion of the storage bin forming a receiving slot, the receiving slot comprises comprising a slide channel that extends along a portion of the elevated platform;
   a radio frequency identification (RFID) tag that is attached to a portion of the storage bin; and a radio frequency (RF)-blocking slide divider that comprises a base panel connected to a divider panel that has a narrowed end, the base panel being inserted in the receiving slot, the narrowed end fitting within the slide channel, wherein the RF-blocking slide divider comprises an RF shield and conceals the RFID tag from detection from the RFID reader at a first position along the slide channel, wherein the RF shield exposes the RFID tag to detection from the RFID reader at a second position along the slide channel, and wherein the second position of the RF shield is further away from an end of the receiving slot in comparison to the first position; and
   wherein the RF tag comprises data representing an inventory threshold, and the RF tag communicates the inventory threshold of the storage bin to the RFID reader upon being activated by the RFID reader.

16. The apparatus of claim 15, wherein the RFID tag is attached to a bottom portion of the storage bin or a back panel of the storage bin.

17. The apparatus of claim 15, wherein the RF shield is attached to a portion of the divider panel.

18. The apparatus of claim 15, wherein the RF shield is attached to the base panel.

19. The apparatus of claim 15, further comprising a coiled spring that is attached to an interior wall of the storage bin and the divider panel.

* * * * *